March 20, 1962 P. B. PHILLIPS 3,026,259
WATER TREATER
Filed June 26, 1958
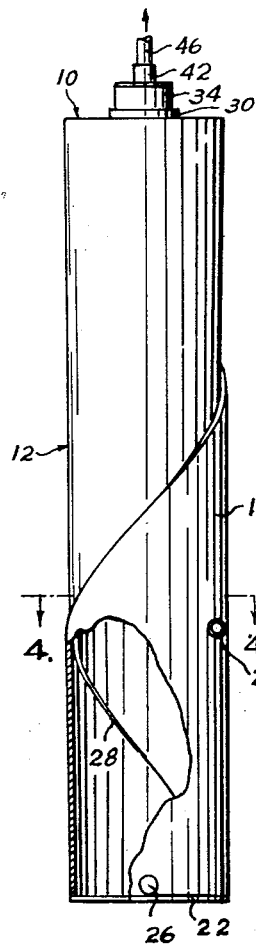
FIG.1.
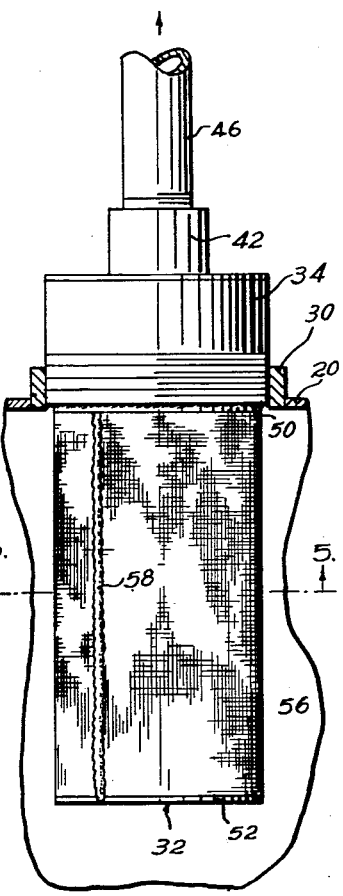
FIG.2.
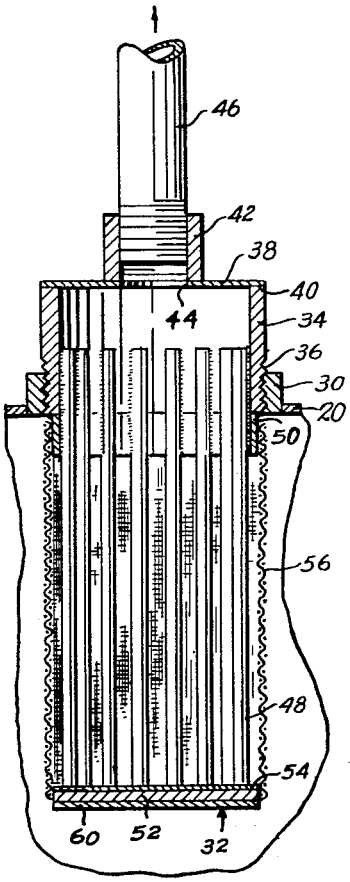
FIG.3.
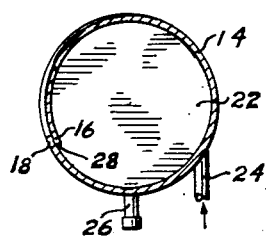
FIG.4.
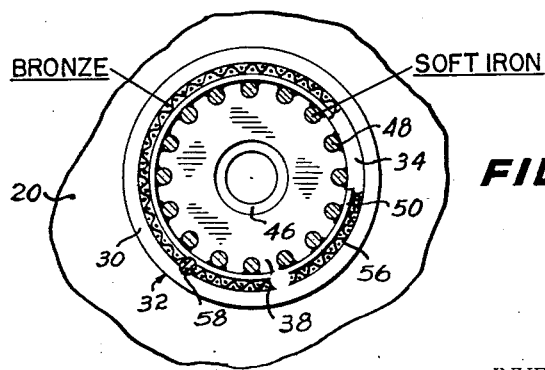
FIG.5.
INVENTOR.
Paul B. Phillips
BY
ATTORNEY.

United States Patent Office 3,026,259
Patented Mar. 20, 1962

3,026,259
WATER TREATER
Paul B. Phillips, 109 E. West Plains, Meade, Kans.
Filed June 26, 1958, Ser. No. 744,784
6 Claims. (Cl. 204—249)

This invention relates to apparatus for treating water flowing through a supply line to prevent scale-forming materials contained in the water from being attracted to and accumulating on surfaces exposed to the water after the latter flows from the apparatus. More particularly, this invention is concerned with provision of a water treater of the type adapted to be operably connected in a water supply line to prevent mineral compositions and other similar substances in so-called "hard" water from accumulating on pipes and other appurtenances exposed to the water within a predetermined distance from the treater.

It is the primary object of this invention to provide a water treater including a receptacle adapted to be operably connected in the water supply line and having a unit mounted in the receptacle within the flow path of the water and constructed in a novel manner to subject scale-forming materials contained in the hard water to a sufficient electrostatic charge to prevent such materials from being attracted to and accumulating on pipes and other metal surfaces exposed to the water after the latter flows to a point of use from the receptacle.

It is a further important object of the invention to provide a water treater as referred to above, wherein the unit produces an electrostatic charge only in response to flow of water through the receptacle whereby no external control means is needed to regulate subjection of the water to the electrostatic charge during periods of water flow.

Also an important object is to provide a water treater wherein the unit mounted within the receptacle contains components capable of creating electrostatic energy of sufficient intensity to prevent scale-forming materials contained in the water, and subjected to the energy as the water flows through the receptacle, from being attracted to and accumulating on surfaces subsequently exposed to the hard water, the components being designed to produce electrostatic energy responsive to flow of water through the receptacle.

Other important objects of the instant invention include the provision of a water treater wherein the electrostatic energy producing unit within the receptacle includes a number of spaced, soft iron bars disposed in surrounding relationship to the outlet of the receptacle, a bronze, fine mesh screen around the bars, and means connected to the bars and screen for forcing the water to pass through the screen and between the bars as the same flows to the outlet of the receptacle, whereby all of the scale-forming materials in the water are uniformly subjected to the electrostatic charge produced by the unit; to the provision of a treater wherein the screen surrounding the iron bars is of very fine mesh so that larger contaminating particles contained in the hard water are filtered out and gravitate to the lower end of the receptacle for subsequent removal therefrom; to the provision of an electrostatic unit including preselected components of different metals which are disposed in predetermined relationship to assure production of maximum electrostatic energy as the water flows through the treater; to the provision of a water treater wherein the hard water is directed into the receptacle substantially tangentially to the side wall thereof to thereby cause the water to describe a substantially spiral path during flow through the receptacle; to the provision of a water treater receptacle of the type described having an internal, inwardly projecting spiral groove integral with the side wall thereof, serving to enhance spiral movement of the hard water through the treater; and to other important objects and salient features of the instant invention which will become obvious or be explained more fully as the following specification progresses.

In the drawing:

FIGURE 1 is a side elevational view of a water treater embodying the novel components of the instant invention, a portion of the treater receptacle being broken away and in section to reveal details of construction;

FIG. 2 is a fragmentary, enlarged, vertical, sectional view of a portion of the present water treater with the electrostatic unit contained therein being shown in elevation;

FIG. 3 is a fragmentary, enlarged, vertical, cross-sectional view through the portion of the water treater illustrated in FIG. 2;

FIG. 4 is a horizontal, cross-sectional view taken on the line 4—4 of FIG. 1 and looking downwardly in the direction of the arrows; and FIG. 5 is a horizontal, cross-sectional view taken on the line 5—5 of FIG. 2 and looking upwardly toward the outlet of the receptacle and in the direction of the arrows.

Briefly, the present invention contemplates the provision of an upright, cylindrical receptacle adapted to be operably coupled in a water supply line normally conducting "hard" water to a point of use and includes a unit disposed therein within the path of flow of the water through the receptacle. The unit mounted within the receptacle includes structure responsive to flow of water through the same for subjecting scale-forming materials contained in the hard water to a sufficient electrostatic charge to prevent such materials from being attracted to and accumulating on pipes and other metal surfaces exposed to the water subsequent to passage of the same through the treater.

A water treater embodying the preferred concepts of the instant invention is illustrated in the drawing and broadly numerated 10. Receptacle 12 is constructed of a rectangular metal sheet 14 bent into a spiral configuration with adjacent, overlapping edges 16 and 18 suitably joined as by welding to thereby present a normally upright, cylindrical contianer, opposed ends of which are closed with an upper, annular plate 20 and a lower, circular plate 22.

Water supply inlet line 24 is joined to receptacle 12 and communicates with the latter substantially tangentially to the side wall defined by spirally wound sheet 14. As indicated in FIG. 1 of the drawing, inlet line 24 is disposed between a drain pipe 26 connected to receptacle 12 adjacent lower plate 22, and upper plate 20. It can be recognized that because of the overlapping of edges 16 and 18 of metal sheet 14, an internal, inwardly projecting, spirally configured ledge 28 is presented which serves to improve flow of water through receptacle 12 in a manner to be more specifically defined hereinafter.

An upright, internally threaded flange 30 secured to upper annular plate 22 within the opening thereof serves as means for mounting an electrostatic unit broadly designated 32 and disposed within the flow path of water through receptacle 12. Unit 32 has a tubular collar 34 externally threaded as at 36 and adapted to be complementally threaded into flange 30 joined to upper plate 20. Annular plate 38 secured to the normally upper circular edge 40 of collar 34 mounts a tubular fitting 42 secured to the upper face of annular plate 38 in coaxial relationship with the inner opening 44 in plate 38. Fitting 42 is internally threaded to complementally receive the externally threaded end of an outlet pipe 46 extending upwardly from receptacle 12.

Welded to the inner cylindrical surface of collar 34 are a number of circumferentially spaced, soft iron bars 48, it also being pointed out that collar 34, plate 38 and fitting 42 are constructed of iron, while treater 10 gives the best results when receptacle 12 and flange 30 are fabricated from steel. As most clearly shown in FIG. 3, the normally uppermost ends of iron bars 48 are welded to the inner surface of collar 34 and depend from the same in substantially parallel relationship. It has been found that sixteen ¼" of iron bars arranged circumferentially of collar 34 give the best results in treatment of hard water, in a manner to be hereinafter related.

A ⅝" strip 50 of 20-gauge copper is wrapped around bars 48 with opposed ends thereof in abutting relationship and the upper circular edge of strip 50 engaging the lower edge of collar 34, as illustrated in FIG. 3.

The lowermost ends of rods 48 opposed to collar 34 are joined to a circular plate 52 of soft iron by a layer of bronze 54 completely covering the upper face of plate 52. A 60-mesh screen 56 of bronze is wrapped around copper strip 50, iron bars 48 and plate 52 with opposed ends of screen 56 being positioned in abutting relationship overlying the butted ends of strip 50. A relatively heavy line 58 of tin-lead solder interconnects the butted ends of screen 56, the ends of strip 50, and plate 52. As shown in FIG. 3, the lower face of circular plate 52 is coated with a layer 60 of tin-lead solder and line 58 is joined to layer 60.

It can now be ascertained that as water is directed to a point of use through outlet pipe 46 and water to be treated is introduced into receptacle 14 through inlet line 24, such water containing scale-forming materials and therefore termed "hard" water describes a substantially spiral path through the upper part of receptacle 12 in passing to outlet pipe 46 because of the substantially tangential disposition of line 24 with respect to the side wall 14 of receptacle 12. The spiral action of the water entering receptacle 12 is enhanced by virtue of ledge 28 and furthermore, particles of larger than colloidal size are settled out by sedimentary, centrifugal action and gravitate to the lower part of receptacle 12 where the same may be removed periodically through outlet drain pipe 26. It can be appreciated that screen 56 also helps to filter out particles contained in the water entering receptacle 12 and the spiral action of the water passing through the treater tends to wash such particles from the outer surface of screen 56 and thereby permits the same to gravitate to the lower end of receptacle 12 below inlet line 24.

Plate 52 disposed at the lower ends of bars 48 forces the water passing through treater 10 to flow through screen 56 and between bars 48 in passing to outlet pipe 46. As the hard water is directed through unit 32, the scale-forming minerals and materials contained in the water are subjected to an electrostatic charge of predetermined intensity produced by unit 32 responsive to flow of the water and sufficient to prevent such scale-forming materials from being attracted to and accumulating on outlet pipe 46 and other metal surfaces exposed to the water after the same flows from treater 10. The exact manner in which unit 32 operates to prevent the scale-forming materials, such as magnesium and calcium carbonate, contained in the water and thereby making the same hard, from being attracted to and accumulating on pipe 46 and other surfaces exposed to the water, is not understood entirely but it is believed that the electrostatic energy produced by unit 32 neutralizes or changes the charge on the mineral materials so that the same are not attracted to pipes and other appurtenances exposed to the water after the same leaves treater 10. For example, during rapid flow of hard water through treater 10, it has been determined that the electrostatic potential produced by unit 32 is of the order of 5 volts, although it is not known whether such charge is positive or negative relative to the ground, inasmuch as the polarity of the ground is known to change with atmospheric conditions. In any event, the electrostatic charge produced by unit 32 and to which the mineral compositions in the hard water are subjected as the water passes through treater 10, prevents such materials from accumulating on pipes and other surfaces exposed to the water within a predetermined distance from treater 10. In this connection, it is to be noted that if the water conveyed from treater 10 must travel a substantial distance to a point of use, it may be necessary to place another treater 10 within such line in order to preclude accumulation of the mineral substances contained in the water on the conduits.

Experimental tests have also shown that treater 10 is capable of removing accumulated deposits from pipes and other surfaces when treater 10 is operably connected in the water supply line. Again, the physical reason for removal of the accumulated deposits is not fully understood but is believed to be attributable to the electrostatic charge produced by unit 32 in response to flow of water through receptacle 12.

Unit 32 has a long useful life but the same may be readily replaced by merely removing collar 34 from flange 30 and introducing a new unit 32 into receptacle 12. Also, cleaning of treater 10 may be easily accomplished by closing a valve in outlet pipe 46 and opening a valve in line 24, as well as in drain pipe 26. Thus, all sediment collected in the bottom part of receptacle 12, as well as excess chlorine which is retained within treater 10, may be directed into a suitable sewer outlet.

Having thus described the invention what is claimed as new and desired to be secured by Letters Patent is:

1. In a water treated, a receptacle provided with an inlet adapted to be connected to a water supply line and an outlet adapted to be coupled to a discharge line; and a unit mounted in said receptacle in a position causing the water to flow through the same and including means responsive to flow of the water for creating electrostatic energy of sufficient intensity to prevent scale-forming materials contained in the water, and subjected to said energy as the water flows through the receptacle, from being attracted to and accumulating on surfaces exposed to the water after the latter is discharged through said outlet of the receptacle, said unit including a number of circumferentially spaced, soft iron bars and disposed in surrounding relationship to said outlet, a fine mesh bronze screen closely surrounding said bars and plate means connected to said bars and said screen for forcing the water to flow through the screen and between said bars in passing from the inlet to said outlet of the receptacle to thereby subdivide the water into a very large number of individual streams during passage through the unit to assure uniform subjection of the water to said electrostatic energy.

2. A water treater as set forth in claim 1 wherein is provided a copper strip interconnecting all of said iron bars, joined to said screen and spaced from said plate means.

3. A water treater as set forth in claim 2 wherein one face of said plate means is coated with solder and wherein a line of solder interconnects the copper strip, said screen and the coating of solder on said plate means.

4. A water treater as set forth in claim 3 wherein the bars are joined to the other face of said plate means with a bronze coating completely covering said other face thereof.

5. A water treater as set forth in claim 4 wherein the bars are welded in equally spaced relationship to a soft iron collar surrounding said outlet.

6. In a water treater, a cylindrical receptacle provided with an inlet tangential to said receptacle and adapted to be connected to water supply line, and an outlet adapted to be coupled to a discharge line; and a unit mounted in said receptacle in a position causing the water to flow spirally through the same and including means responsive to flow of the water for creating electrostatic energy of sufficient intensity to prevent scale-forming materials contained in the water, and subjected to said energy as the water flows through the receptacle, from being attracted to and accumulating on surfaces exposed to the water after the latter is discharged through said outlet of the receptacle, said unit including a number of circumferentially spaced, soft iron bars disposed in surrounding relationship to said outlet, a fine mesh bronze screen closely surrounding said bars and plate means connected to said bars and said screen for forcing the water to flow through the screen and between said bars in passing from the inlet to said outlet of the receptacle to thereby subdivide the water into a very large number of individual streams during passage through the unit to assure uniform subjection of the water to said electrostatic energy.

References Cited in the file of this patent

UNITED STATES PATENTS

| | | |
|---|---|---|
| 34,455 | Wilcox | Feb. 18, 1862 |
| 564,940 | Sellers | July 28, 1896 |
| 823,671 | Dieterich | June 19, 1906 |
| 1,293,651 | Smith | Feb. 4, 1919 |
| 2,358,981 | Lattner | Sept. 26, 1944 |
| 2,607,725 | Butler | Aug. 19, 1952 |
| 2,687,996 | Butler | Aug. 31, 1954 |
| 2,754,260 | Butler | July 10, 1956 |

FOREIGN PATENTS

| | | |
|---|---|---|
| 14,818 of 1899 | Great Britain | July 7, 1900 |